Figure 1:
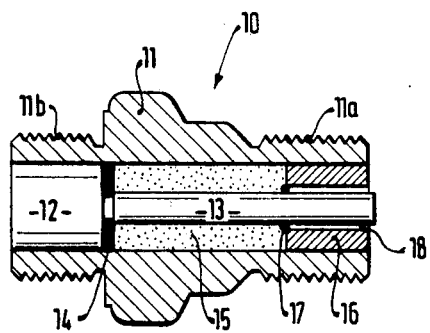

United States Patent [19]
Burkel et al.

[11] 4,409,815
[45] Oct. 18, 1983

[54] COMBUSTION PROCESS SENSOR ARRANGEMENT

[75] Inventors: Rainer Burkel, Asperg, Fed. Rep. of Germany; Cornelius Peter, Paris, France; Klaus Muller, Tamm, Fed. Rep. of Germany

[73] Assignee: Robert Bosch GmbH, Postfach, Fed. Rep. of Germany

[21] Appl. No.: 314,529

[22] Filed: Oct. 26, 1981

[30] Foreign Application Priority Data

Nov. 11, 1980 [DE] Fed. Rep. of Germany ....... 3042454

[51] Int. Cl.³ ............................................. G01L 23/22
[52] U.S. Cl. ......................................... 73/35; 73/116; 350/96.2
[58] Field of Search .................... 73/35, 116; 250/227; 350/588, 589, 96.2, 319; 313/129; 374/131

[56] References Cited

U.S. PATENT DOCUMENTS 2,841,979  7/1958  Harbert .................................. 73/35
4,181,397  1/1980  Baker et al. ........................ 350/96.2

FOREIGN PATENT DOCUMENTS 699972  11/1953  United Kingdom ................ 313/129

*Primary Examiner*—James J. Gill
*Attorney, Agent, or Firm*—Frishauf, Holtz, Goodman & Woodward

[57] ABSTRACT

To permit the use of molten glass in a sensor which has excellent characteristics with respect to capability of being melt-connected to a housing (11) while being pressure-resistant, a glass plug (12) is melt-connected to the housing (11) at a point remote from the end facing the combustion chamber; a quartz-glass rod (13), maintained in centered positioned in the housing by a powder or pulverized filling (15) of talcum, graphite, or spinel, is retained in the housing by a retention sleeve (16) pressing against a sealing O-ring (17); a bulge (13a) additionally contributes to maintaining the quartz-glass rod in position, and a spring washer (19) may be used, interposed between the quartz-glass rod (13) and the melted-in window (12) to accommodate differential expansion, under heating, of the filler (15) and the housing (11).

8 Claims, 3 Drawing Figures

U.S. Patent  Oct. 18, 1983  4,409,815

COMBUSTION PROCESS SENSOR ARRANGEMENT

Reference to related application, assigned to the assignee of this invention:
U.S. Ser. No. 06/214,481, filed Dec. 9, 1980, MULLER, LINDER & MAURER.

The present invention relates to a combustion process sensor construction and more particularly to a combustion process sensor which is adapted to be inserted through the cylinder head of an internal combustion engine, which may be an Otto-type engine or a Diesel-type engine, and which includes a light guide element to permit viewing of the actual combustion process which occurs upon ignition of the air-fuel mixture within the combustion chamber of the engine.

BACKGROUND

It is desirable to determine the occurrence of various physical parameters during the combustion phase of the air-fuel mixture occurring within the combustion chamber of an internal combustion engine. Preferably, the combustion process with respect to time should be observed during actual operation of the engine. Observation may, for example, extend to the temporal and geometric distribution of the flame occurring during combustion; sensing of the ignition instant, sensing of fuel injection or supply processes; and, especially sensing of undesirable or irregular combustion processes.

Irregular combustion may result in knocking of the engine. Such knocking occurs under certain operating conditions. Knocking, as usually understood, is caused by oscillations within the audible frequency band of the compressed fuel-air mixture which is triggered by a shock wave. The heat transmission to the piston walls and cylinder walls of the engine is substantially increased during such oscillations. A thermal overload of the surfaces will result, so that knocking should be avoided. For most efficient operation of the engine, it is desirable to utilize the working range of the engine to the greatest possible extent and, therefore, the engine should be operated just below the "knocking limit". It is necessary to have some means which early and reliably indicate knocking or a tendency to knock, so that the operating parameter of the internal combustion (IC) engine can then be so controlled that the engine will operate just below the knocking limit.

Various types of sensors to determine knocking have been proposed. Mechanical systems which sense the transferred oscillations to the engine, for example using a piezoelectric sensor, are easily made but have the disadvantage that such systems are difficult to operate reliably and free from interference and stray signals, since they also may respond to externally generated jolts and oscillations which arise in the operation of a vehicle to which the engine may be coupled, for example over bad roads or corrugated roads.

It has also been proposed to sense and observe the combustion process by optical means. An optical sensor and background literature are described in the cross-referenced application, assigned to the assignee of the present application, Ser. No. 06/214,481, filed Dec.9, 1980, MULLER et al. This application discloses a sensor which includes light guide fibers or filaments which are positioned to sense the combustion event optically, the light guides being connected to a photoelectric transducer which, in turn, provides output signals to a tuned or filter circuit which is responsive to or tuned to expected knocking frequency to provide an output signal if shock waves occurring within the combustion chamber are of a frequency which results in engine knocking. Of course, the signals derived from the photoelectric transducer can be processed in any desired manner. The aforementionedpatent application further describes integration of the light guide with a spark plug of an internal combustion engine; or to place light guides in the cylinder head gasket or seal, for eventual connection to photoelectric transducers.

Sensing physical parameters occurring with the combustion chamber of an IC engine by optical means causes problems: The optical element which faces the combustion, chamber, for example a glass rod, a fiber cable, or the like, will become dirty or blackened during operation, particularly upon extended operation, so that effective output and suitable measuring and evaluation of the light output becomes difficult, and in a limiting case even impossible after some operating time. Various proposals have been made to keep the side of the light guide facing the combustion chamber clean, or to so position and shape that portion of the light guide that it will be subjected to flushing action by induced fuel, swirling air-fuel gases, and the like, to thereby maintain the optical transmissivity thereof.

One of the difficulties which arise is that ordinary glasses which can provide windows to the light guides can be used only in the"cold" area of a sensor secured through a cylinder head of the IC engine, that is, at the side of the sensor remote from the combustion chamber since the heat during combustion will cause the glasses to melt. The glasses, however, being exposed to the combustion gases, will be subjected to fogging and deposits from combustion residues which will precipitate preferentially on the "cold" surface of the window, that is, cold with respect to combustion temperature. Yet, ordinary glasses have the advantage that they can be melted into a fitting or socket to be both gas-tight as well as pressure resistant to the high operating pressures arising within the combustion chamber. Light guides made of quartz-glass are temperature-stable, but cannot be placed in a sensor housing and secured by a melt connection.

THE INVENTION

It is an object to provide a sensor arrangement in which contamination by dirt, soot, or blackening is minimized, so that physical processes occurring in the combustion chamber of an internal combustion (IC) engine can be evaluated optically.

Briefly, a housing, which may be similar to a spark plug-type housing, has a light guide extending therethrough to transmit light from the interior of the combustion chamber, the light guide including a window melted into an opening formed in the housing and a quartz-glass rod facing the window and positioned in light-transmitting relationship therewith.

The arrangement has the advantage that optical measuring of physical processes within the combustion chamber of an IC engine can be carried out with minimal blackening, soot formation, or contamination of a window area of the sensor.

DRAWING

Figure 2:
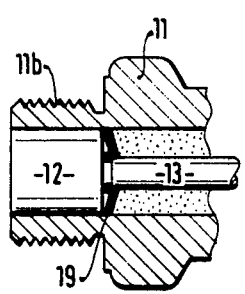
Figure 3:
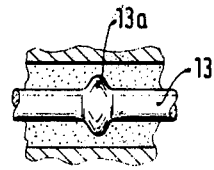

FIG. 1 is a schematic axial cross section of a sensor;
FIG. 2 is a fragmentary cross section of the sensor illustrating another embodiment; and FIG. 3 is a fragmentary cross section illustrating yet another embodiment.

The sensor 10 (see FIG. 1) is positioned within a housing 11 which, generally, may be similar to an ignition spark plug. It has an external thread 11a to face the combustion space of an IC engine. The sensing end or terminal end of the housing 11 has a further thread 11b to permit connection to any kind of light guide which may be used with the sensor, and to provide coupling of a jacket or an outer protective cable covering of a light guide cable, for example a bundle of fiber-optic filaments for further connection to a photoelectric transducer.

In accordance with the invention, a plug of glass 12 is melted in with the housing of the sensor by forming a melt connection therewith. The region of the sensor which faces the combustion chamber has a quartz-glass rod 13 extending thereto, coaxial with the window 12. Window 12 and quartz-glass rod 13 are spaced from each other by a washer 14 made of elastic material. The washer or ring 14 also forms a seal of the transition between the quartz-glass rod 13 and the window 12 with respect to a filling 15 located between the housing 11 and the quartz-glass rod 13. The filling 15 maintains the quartz-glass rod in centered position secure against movement under influence of shock and vibration. The filler 15 is a powder or pulverized substance which is heat and pressure resistant, for example talcum, graphite, or spinel powder. The filling 15 can be introduced, upon assembly, from the combustion chamber side, and compacted. A ring 16 is fitted to close off the filling 15 against the combustion chamber, the ring 16 being press-fitted into the housing 11, and then secured therein, for example by welding, brazing or soldering. A sealing ring 17 is provided between the fitting ring 16 and the rod of quartz-glass 13. The sealing ring 17 is fitted over the quartz-glass rod and, upon introduction of the ring 16, tightly compressed therein. When the components are assembled, sealing ring 17 forms a seal for the powder or pulverized material 15 with respect to the end of the quartz-glass rod 13. A gap 18 is left between the fitting ring 16 and the quartz-glass rod 13. The gap 18 is so dimensioned that the glass rod 13 can heat to the extent that contamination or dirt, soot or blackening by combustion residue will be burned off; thus, contamination due to combustion residue will not collect on the free end of the quartz-glass rod 13.

To operate the sensor 10, the thread portion 11a is screwed into a suitably tapped opening in the cylinder head of an IC engine. The quartz-glass rod 13 faces the combustion chamber and may even extend slightly thereinto. Light which is generated upon ignition and combustion of the air-fuel mixture within the combustion chamber is transferred through the quartz-glass rod 13, over the gap formed by the ring 14 to the glass plug window 12. From the glass plug window 12, the light is further transferred to a photoelectric transducer over a suitable cable, preferably a light guide filament cable which is coupled to the sensor structure 11 by a suitable coupling screwed on the threads 11b.

The quartz-glass rod 13 can be retained in the housing not only by the compression ring 17, but also by other means. Referring to FIG. 2: A spring washer 19 is provided located between the rod 13 and the melted-in glass window 12 to permit deformation of the ring 19 and allow for differential thermal expansion of the volume of the filling 15 with respect to the remainder of the plug.

The quartz-glass rod may be formed with a central bulge 13a—see FIG. 3—in order to improve retention of the quartz-glass rod 13 in the filling material 15. In addition thereto, or in lieu of the bulb 13a, a surface coating can be applied to the quartz-glass rod 13 to increase its surface friction.

The arrangement has the advantage that a window can be used which is resistant to pressures and pressure waves which arise during combustion in an IC engine while, additionally, providing for a gas-tight seal. The glass window 12 is positioned at an area remote from the combustion chamber. A quartz-glass rod is provided facing the combustion chamber which, by suitable heating thereof, can be maintained free from combustion residue. The elastic assembly of the quartz-glass rod in the overall arrangement eliminates the necessity for precise and exact manufacture of the quartz-glass rod and precise assembly. It is only necessary to break off a suitable length of the quartz-glass rod from a length of caning to obtain the required length therefor. This permits inexpensive manufacture of a combustion chamber sensor which has high reliability in operation, is highly resistant with respect to pressure and gas leakage, and essentially insensitive to contamination by combustion residue.

Various changes and modifications may be made, and features described in connection with any one of the embodiments may be used with any of the others, within the scope of the inventive concept.

In one embodiment, the quartz-glass rod 13 had a diameter of 3 mm. The glass 12 was Duran, and had a diameter of 12 mm, and an axial length of 15 mm, fitted in a housing 11 made of stainless steel. The sealing ring 17, which may be an O-ring, was made of PERBUNAN (a synthetic rubber); washer 14 was made of copper, and had a thickness of 2 mm. A suitable gap 18 is 0.1 mm, and the material for the compression sleeve 16 is stainless steel.

We claim:

1. Combustion process sensor arrangement to determined the physical processes occurring in the combustion space of a combustion chamber of an internal combustion engine having
   a housing (11) having a combustion chamber end portion adapted to be fitted into the engine facing the combustion chamber,
   and a light guide extending through the housing to transmit light from the interior of the combustion chamber during operation of the engine,
   wherein the light guide comprises
   a window (12) melted into an opening formed in the housing remote from the combustion end portion;
   and a quartz-glass rod (13) facing the window and being positioned in light-transmitting relationship thereto, and extendingtowards the combustion end portion,
   and wherein the window (12) and the quartz-glass rod are coaxially arranged within the housing (11);
   and an elastic element (14, 19) is provided interposed between the window and said quartz-glass rod.

2. Sensor arrangement according to claim 1, wherein said elastic element comprises an elastic ring or washer (14).

3. Combustion process sensor arrangement to determined the physical processes occurring in the combustion space of a combustion chamber of an internal combustion engine having a housing (11) having a combustion chamber end portion adapted to be fitted into the engine facing the combustion chamber, and a light guide extending through the housing to transmit light from the interior of the combustion chamber during operation of the engine, wherein the light guide comprises a window (12) melted into an opening formed in the housing remote from the combustion end portion;

and wherein holding means (16, 17) are provided, elastically retaining the quartz-glass rod in position, located in the vicinity of the combustion end portion of the housing;

the opening in the housing extends axially therethrough and is of greater diameter than the diameter of the quartz-glass rod (13);

and a powdery or pulverized filler material (15) is provided, filling the space between the quartz-glass rod and the interior walls of the opening.

4. Sensor arrangement according to claim 3, wherein the powdery or pulverized filler material comprises at least one of the materials of the group consisting of: graphite, talcum, spinel.

5. Sensor arrangement according to claim 3, further including a compression sleeve (16, 17) fitted into the opening of the housing adjacent the combustion end portion thereof and retaining said quartz-glass rod and said filler material within the opening.

6. Sensor arrangement according to claim 3, including a resilient element (19) positioned between the powdery or pulverized filler material and the melted-in window (12).

7. Sensor arrangement according to claim 3, further comprising a bulge (13a) of greater diameter than the diameter of the quartz-glass rod (13) located in the region of the powdery or pulverized filler material to retain the quartz-glass rod in position therein.

8. Sensor arrangement according to claim 3, further comprising a coating of powdery or pulverized material on the quartz-glass rod in the region of the filler, and compatible therewith.

* * * * *